United States Patent [19]

Eastman

[11] Patent Number: 5,115,120

[45] Date of Patent: * May 19, 1992

[54] SCAN MODULES FOR BAR CODE READERS AND IN WHICH SCAN ELEMENTS ARE FLEXURALLY SUPPORTED

[75] Inventor: Jay M. Eastman, Pittsford, N.Y.

[73] Assignee: Photographic Sciences Corporation, Rochester, N.Y.

[*] Notice: The portion of the term of this patent subsequent to May 14, 2008 has been disclaimed.

[21] Appl. No.: 543,950

[22] Filed: Jun. 26, 1990

[51] Int. Cl.$^5$ .......................... G06K 7/10; H01J 3/14; H01J 5/16; G02B 26/08
[52] U.S. Cl. .................................. 235/462; 235/470; 235/472; 250/235; 359/199; 359/214
[58] Field of Search ............... 235/470, 472, 462, 467, 235/454; 369/44.15, 44.16; 250/566, 235; 359/198, 199, 214, 210

[56] References Cited

U.S. PATENT DOCUMENTS

| | | | |
|---|---|---|---|
| 3,820,911 | 4/1989 | Arackellian et al. | 235/472 |
| 4,051,529 | 9/1977 | Miyaoka | 369/44.15 |
| 4,063,287 | 12/1977 | van Rosmalen | 369/44.15 |
| 4,135,206 | 1/1979 | Kleuters et al. | 369/44.15 |
| 4,193,091 | 3/1980 | Kleuters et al. | 369/44.15 |
| 4,337,531 | 6/1982 | Willemsen | 369/44.15 |
| 4,538,882 | 9/1985 | Tanaka et al. | 369/44.16 |
| 4,578,571 | 5/1986 | Williams | 235/472 |
| 4,667,255 | 5/1987 | Lindberg | 235/470 |
| 4,732,440 | 3/1988 | Gadhok | 359/214 |
| 4,750,164 | 6/1988 | Nose | 369/44.15 |
| 4,805,175 | 2/1989 | Knowles | 235/472 |
| 4,861,125 | 8/1989 | Vaught | 359/214 |
| 4,902,083 | 2/1990 | Wells | 350/486 |
| 4,927,235 | 5/1990 | Narumi | 369/44.15 |
| 4,983,818 | 1/1991 | Knowles | 235/462 |
| 5,015,831 | 5/1991 | Eastman et al. | 235/462 |

FOREIGN PATENT DOCUMENTS 0341717 11/1989 European Pat. Off. .
62-34338 2/1987 Japan ................. 369/44.16

*Primary Examiner*—Stuart S. Levy
*Assistant Examiner*—Christopher R. Glembocki
*Attorney, Agent, or Firm*—Martin Lukacher

[57] ABSTRACT

A miniature scan module which is adapted to be installed as part of a terminal or other apparatus for the reading of bar codes has an integrated assembly of a laser diode and a photodetector which is rotatably mounted for reciprocation about an axis of rotation. The assembly is supported in whole or in part on and connected electrically to, a mounting board by flexures which extend between the integrated assembly and supports (posts) on the board. The assembly has a body with a wall and a platform. The wall supports the laser and has a reflective surface which directs light resulting from the scanning of the laser beam across the bar code to the detector. The assembly also carries printed circuits connected to the detector and the laser diode. Connections are made through the flexures to these printed circuits and to other circuits on the mounting board.

23 Claims, 7 Drawing Sheets

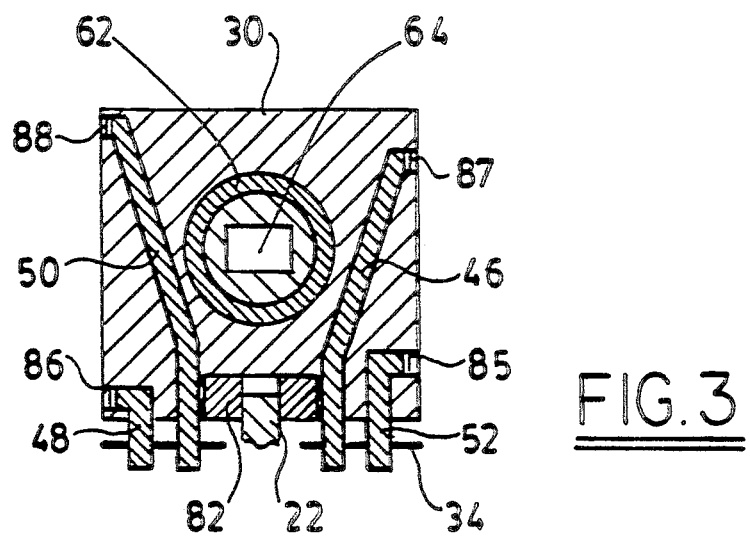
FIG.3
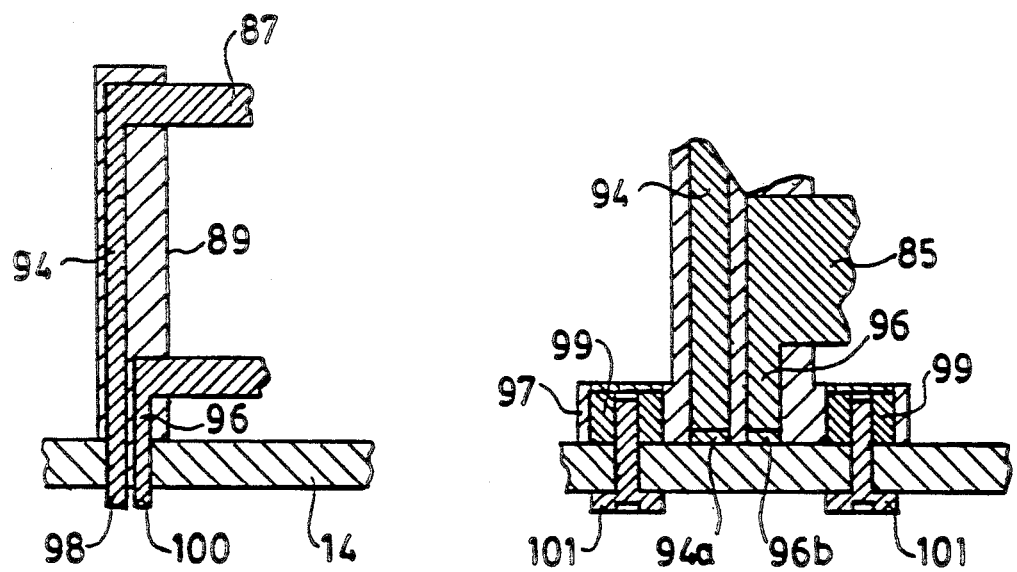
FIG.4
FIG.5

SCAN MODULES FOR BAR CODE READERS AND IN WHICH SCAN ELEMENTS ARE FLEXURALLY SUPPORTED

DESCRIPTION

The present invention relates to optical scanning devices and particularly to miniature scan modules, which provides the facilities for scanning a light beam and receiving reflected light from a symbol such as a bar code or other target.

The invention is especially suitable for use in providing optical scanning capability in terminals, keyboards and data collection devices. Because of the miniature size of the module, it can readily be incorporated into space available in the housing of the apparatus in which it is used, or can readily be added to the apparatus without increasing significantly the size thereof.

The miniaturization of bar code scanners has been sought after since bar coding of products and inventories came into use. The first bar code scanners were permanent installations in or under counters. Then, scanning guns became available. These guns provided signals to data collection and processing terminals. With the availability of micro-miniature computer chips, it became desirable to incorporate the optical bar code scanning component into the terminal as a unitary device. Miniaturization of the optical scanning components, which generate the light beams which scan the bar code and collect the light from the code and provide electrical bar code signals, has represented a significant challenge because of difficulties in supporting the lasers and photodetectors and their interconnecting circuitry as a package of the shape and volume desired; for example, a profile less than one inch high, less than two inches long and two inches wide. Moreover, the support must carry optical components capable of collecting a large part of the light reflected from the bar code symbol as it is scanned with a minimum of optical components which efficiently handle the light. Only then will the bar code signals have signal to noise ratios sufficient to reduce the error rates in the bar code readings. A significant challenge is also the need for reliable operation under adverse conditions. Some specifications require that the scanner operate reliably after repeated drop tests which apply acceleration forces of 5,000 times the acceleration of gravity or more. In a miniaturized scanner there is no room for complex and space consuming shock mounts. Moreover, the optical elements must be movable in order to enable scanning of the bar code symbols, even further complicating and making it more difficult to meet the specifications as to withstanding of shock.

Bar code scanners have been suggested in which optical assemblies are spring mounted so as to enable them to be nutated for scanning of bar codes. See Williams, U.S. Pat. No. 4,578,571, issued Mar. 25, 1986. In U.S. Pat. No. 5,015,813 of J. M. Eastman and John A. Boles, issued May 14, 1991, there is disclosed a miniaturized bar code scanner in which optical components are mounted on flexures which both support the components with sufficient stiffness to withstand high levels of shock and provide conductors for electrical currents to the laser which generates the scanning beam. European Patent Application 341,717 published Nov. 15, 1989 describes another approach using hard mounted assemblies of a motor, laser and photodetector in an effort to eliminate mirrors from the scanner. The configuration of the scanner into a highly miniaturized package capable of withstanding the requisite operating conditions, particularly shock, are not addressed in this European Patent Application.

Accordingly, it is the principal object of the present invention to provide an improved miniature scan module capable of performing the scanning beam generating and light collecting functions needed for bar code reading in a configuration which is sufficiently robust to operate reliably in practical working environments.

It is a still further object of the present invention to provide an improved bar code scan module utilizing flexures in a manner to facilitate the miniaturization of the module and provide mechanical stiffness and robustness for practical operation.

It is a still further object of the present invention to provide an improved miniaturized scan module for bar code reading which contains all of the optical and electronic facilities needed to output a signal containing information as to the bar codes being scanned.

It is a still further object of the present invention to provide an improved miniaturized scan module which may be implemented with a minimum of components and at low cost.

Briefly described, a bar code scan module in accordance with the invention uses a mounting board which supports the module and which provides means for attaching the module to a housing. A body having a platform and a wall carries an opto-electronic assembly including a laser diode on one side of the wall, a photodetector on the opposite side of the wall and electronic circuits for powering the laser diode and collecting electrical signals from the photodetector. The photodetector is mounted on the platform and is illuminated by light from the code which is reflected by a mirror formed on the surface of the wall which faces the photodetector. The laser diode is mounted on the opposite surface of the wall and projects the scanning beam through an aperture in the wall past the photodetector so that the beam can be made incident on the bar code and can scan the code. A plurality of flexures flexurally support, at least in part, the body on the mounting board and provide electrically conducting paths between the mounting board and the opto-electronic assembly. These flexures preferably consist of two pairs of spring bands with their side surfaces aligned in vertically stacked relationship. The flexures are connected to a support extending from the mounting board and are also connected to the wall to define an axis of rotation of the assembly of the body and the optical and electrical elements mounted thereon. This scanning assembly is reciprocally rotated about the axis; preferably by an electromagnetic driver with a movable magnet mounted on the body as part of the scanning assembly and drive coils mounted on the mounting board.

The foregoing and other objects, features and advantages of the invention as well as presently preferred embodiments thereof, will become more apparent from a reading of the following description in connection with the accompanying drawings in which:

FIG. 3 is a sectional view taken along the line 3—3 in FIG. 1;

FIGS. 4 and 5 are fragmentary sectional views taken along the line 4—4 of FIG. 1 and showing alternative constructions of the flexure supports on the mounting board;

Figure 1:
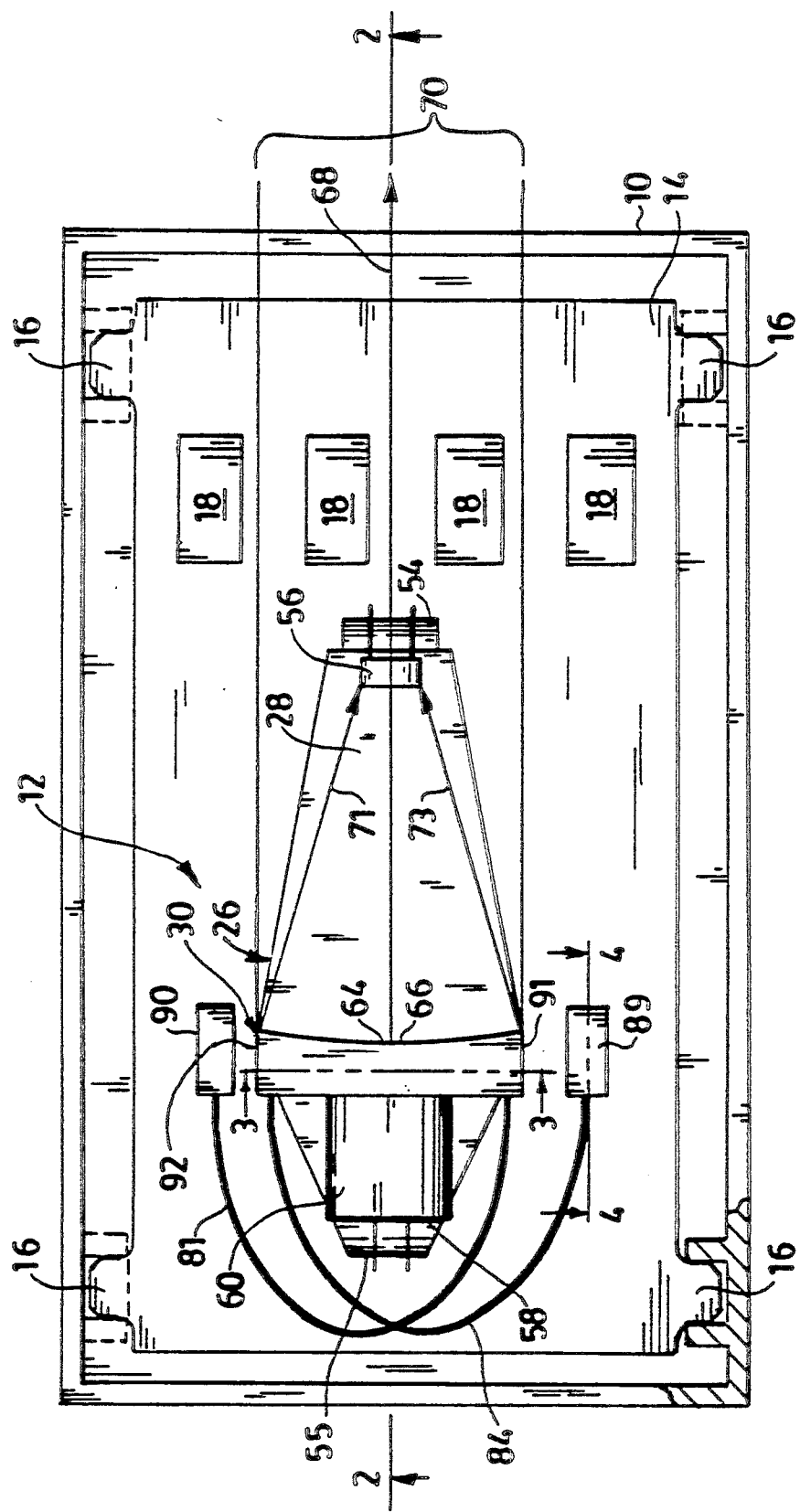
FIG. 1 is a plan view illustrating a scan module in accordance with a first embodiment of the invention.

Referring more particularly to FIGS. 1 through 4, there is shown a housing 10 on which the scan module 12 is located. The scan module has a mounting board 14 with ears 16. The ears may have rubber sleeves or grommets thereon (not shown in this drawing) which attach the board 14 to the housing 10. Also, the housing is not shown in FIG. 2. The mounting board 14 is suitably a conventional epoxy glass printed circuit board having surface mounted (SMD) integrated circuit components or chips 18 on the surfaces thereof. These components 18 are connected to wiring on the board 14, which wiring is not shown to simplify the illustration. A flexurally mounted electro-optic scanning assembly 26 is rotatably supported on the board 14. The board 14 has a journal provided by a bushing 24. A shoulder screw 20 has a shank with a threaded tip 22. A threaded insert ring 82 fixedly held in the assembly 26 receives the tip 22. The rest of the shank and the head of the screw 22 is rotatable in the journal about an axis 80 which is the axis of rotation of the flexurally mounted electro-optical scanning assembly 26, allowing greater resistance to mechanical shock. This rotary assembly provides both a rotational and axial (thrust) support for the assembly 26.

The assembly 26 is provided by a body 28 of high tensile strength plastic material, such as polycarbonate plastic, which is sufficiently strong and rigid to support the remaining elements of the assembly. The body 28 has a wall 30 and a platform section 32. The platform section has mounted thereon a circuit board 34. This circuit board is made of flexible sheet material, such as a polyamide (Kapton), having printed wiring thereon (a flex-board). SMD components 36, providing a preamplifier and laser diode current regulator, are mounted on the flex board 34. The flex board 34 is one piece having two sections; the first section (labelled 34) being below the platform on the forward side 40 of the wall 30, and another rear section 42 on the rear side 44 of the wall 30. The circuits or wiring on the sections 34 and 42 are interconnected to conductors 46, 48, 50 and 52 as shown in FIG. 3. The outer ends 54 and 55 of the flex board sections 34 and 42 are bent upwardly and circuits thereon are connected to a photodetector 56 and a laser diode 58 contained in a diode mounting tube or housing 60.

The laser diode housing 60 is threaded into an insert ring 62 on the rear side 44 of the wall 30. The wall 30 has an aperture 64 which may contain a lens 66.

The laser diode 58 generates a beam of laser light 68 which is focused or gathered so that it is imaged in a field of view including a plane in which the bar code to be scanned can be located.

The light reflected by the bar code is collected within an aperture (area) 70 defined by a reflector or mirror formed on the forward surface 40 of the wall 30. This collection mirror directs the reflected light to the photodetector as indicated by the ray lines 71 and 73 in FIG. 1 and 72 and 74 in FIG. 2.

The assembly 26 also includes a rectangular block 76 of permanent magnet material which is permanently magnetized in a direction transverse to the direction of the beam 68. This permanent magnet cooperates with drive coils 78 which are spaced laterally from each other. These drive coils are alternatively energized with DC current at the rate at which the beam 68 is to be scanned across the bar code. As noted above, the threaded insert ring 82 cooperates with the threaded tip 22 to retain the scanning assembly 26 in the insert sleeve 24, and to form a journal. This journal partially supports the assembly 26. In addition, the assembly 26 is supported by two pairs of flexural elements. These are the pair of flexures 81 and another pair of flexures 84.

Figure 2:
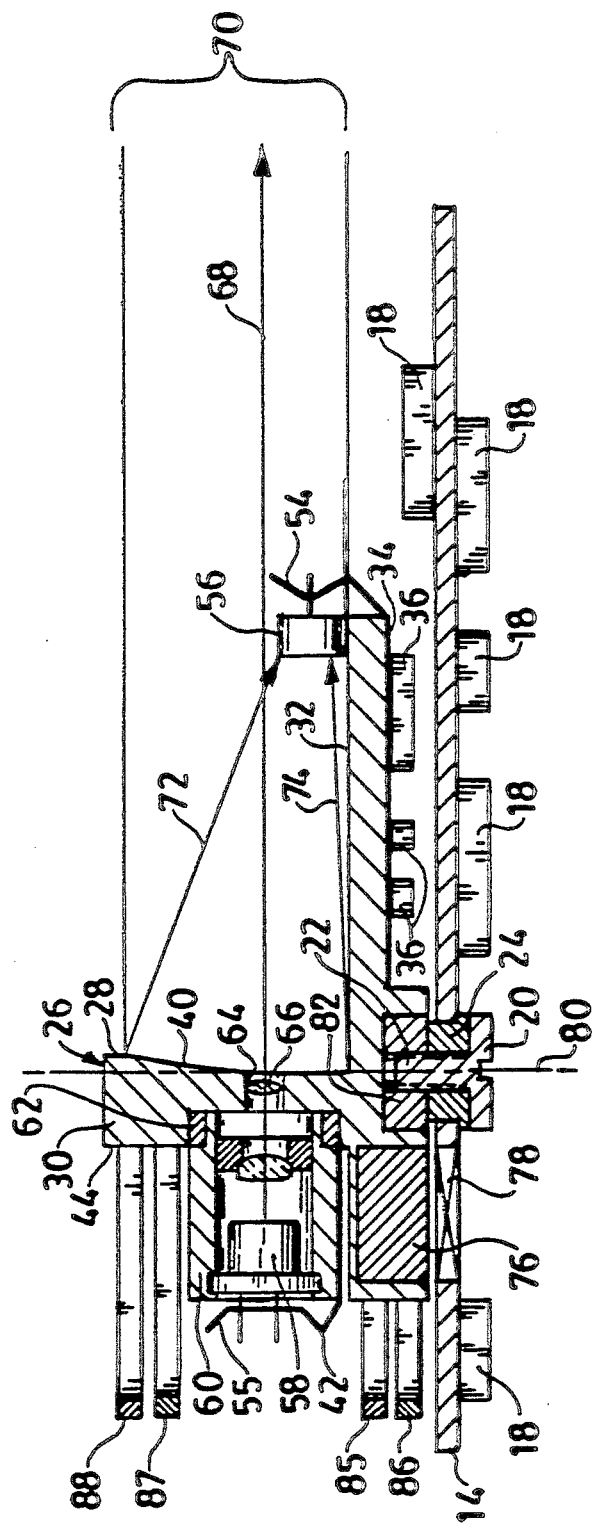
FIG. 2 is a sectional view taken along the line 2—2 of FIG. 1.

The flexures 86 and 88 of the pair 81 and flexures 85 and 87 of the pair 84 are shown in FIG. 2. These flexures consist of bands of spring material such as phosphor bronze, stainless steel or beryllium copper having bends so that they take the general shape of the letter "C". The opposite ends of the flexures are connected to a support provided by a pair of posts 89 and 90 of non-conductive, preferably plastic material, which are connected to, and extend upright from, the mounting board 14. These posts are spaced from the lateral edges 91 and 92 of the wall 30. The posts are connected at one end thereof through flexural elements 85, 86, 87 and 88 to the rear side 44 of wall 30 near the lateral edges 91 and 92 of the wall 30. Connections between the posts 89 and 90 and the assembly 26 are made by the flexures to the segments of the flexures 46, 48, 50 and 52 which are embedded in the body 28 (see FIG. 3). The opposite ends of the flexures extend into the posts 89 and 90 to segments 94 and 96 of the flexures which are embedded therein. These conductors make connections at the lower ends 98 and 100 thereof to the wiring on the mounting board 14. Since the flexures 85, 86, 87 and 88 are conductive, they provide circuit paths for electrical power to the laser diode 58 and for signals which are generated by the photodetector 56. The circuitry and the components 18 and 36 of the circuitry may be of the type conventionally used to power and control the operating current of laser diodes and to handle and process the electrical signals received by photodetectors in bar code scanner and reader systems.

The journal and the flexures define the axis of rotation of the assembly 26 which is shown at 80. This axis is common to the axis of the journal provided by the tip 22 and bearing ring 82. The axis extends through the wall 30. This axis contains the center of mass of the assembly 26. In other words, the forward ends of the flexures are connected generally in the plane of this center of mass. The mass of the assembly and the stiffness of the flexures defines a system resonant at a frequency preferably equal to the scanning rate or twice the scanning rate thereby enhancing the electrical power consuming efficiency of the device 12. The flexures provide mechanical restoring forces to bring the deflected assembly 26 back towards the longitudinal or central axis, which is along the beam path 68 in the position shown in FIG. 1.

Because the two pairs of flexures 81 and 84 are disposed between the board 14 and top of the wall 30, the height or profile of the device 12 may be very low, say less than a few centimeters.

FIG. 5 illustrates another design of the posts 89 and 90. They have a flange 97 with inserts 99. Screws 101 are threaded into the inserts 99. Conductors 94A and 96B which connect the flexures 84 and 85 to wiring on the board 14.

Figure 6:
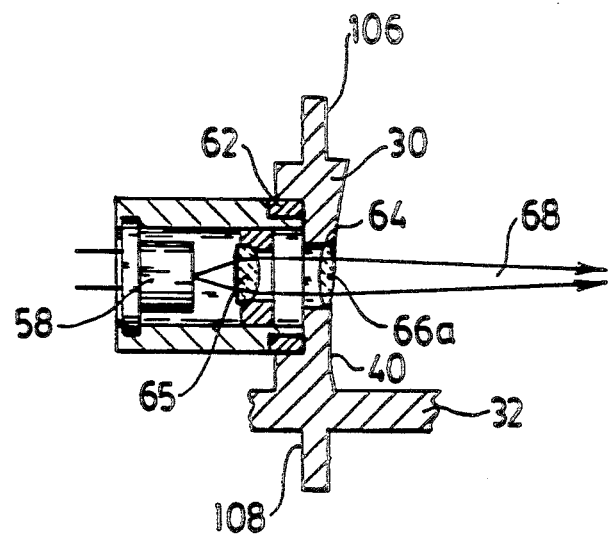
FIGS. 6 and 7 are fragmentary views illustrating the mounting of the laser on the wall of the rotatable body of the scan module illustrated in FIGS. 1-3.
Figure 7:
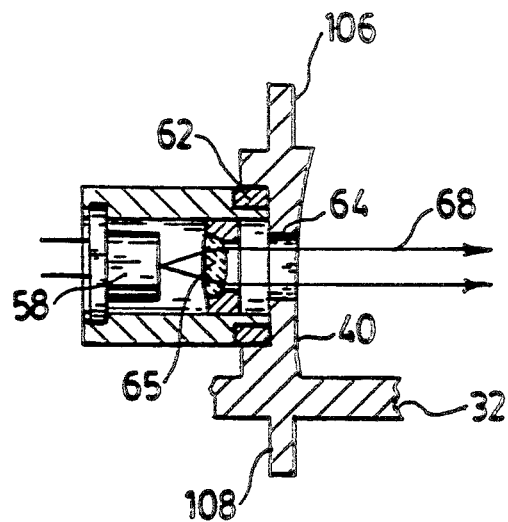

FIGS. 6 and 7 show the body 28 with the wall 30 having longitudinal end (upper and lower) edges 106 and 108 of narrower cross-section than the section of the wall which receives the laser diode 58 and has the mirror or reflector surface 40. In FIG. 6 a collimating lens 65 and a focusing lens 66a is located in the aperture 64 and focuses the beam from the laser 58 in an image plane. The scanner is adjusted so that the bar code is located in the vicinity of this plane. The focusing lens 66a is preferably of "snap in" design so that the reading properties of the scan module may be tailored during the manufacturing process by selection of a suitable "snap in" lens. In FIG. 7 the laser diode 58 and lens 65 provide a collimated generally elliptical (with the major axis vertical) and no lens is used in the aperture 64.

Figure 8:
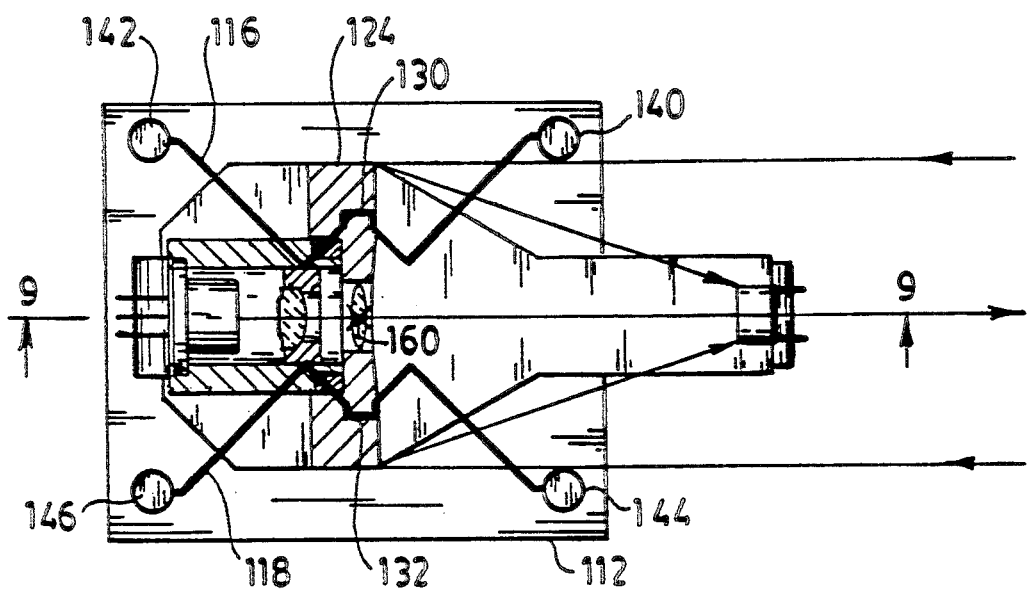
FIG. 8 is a plan view of a scan module in accordance with a second embodiment of the invention.
Figure 9:
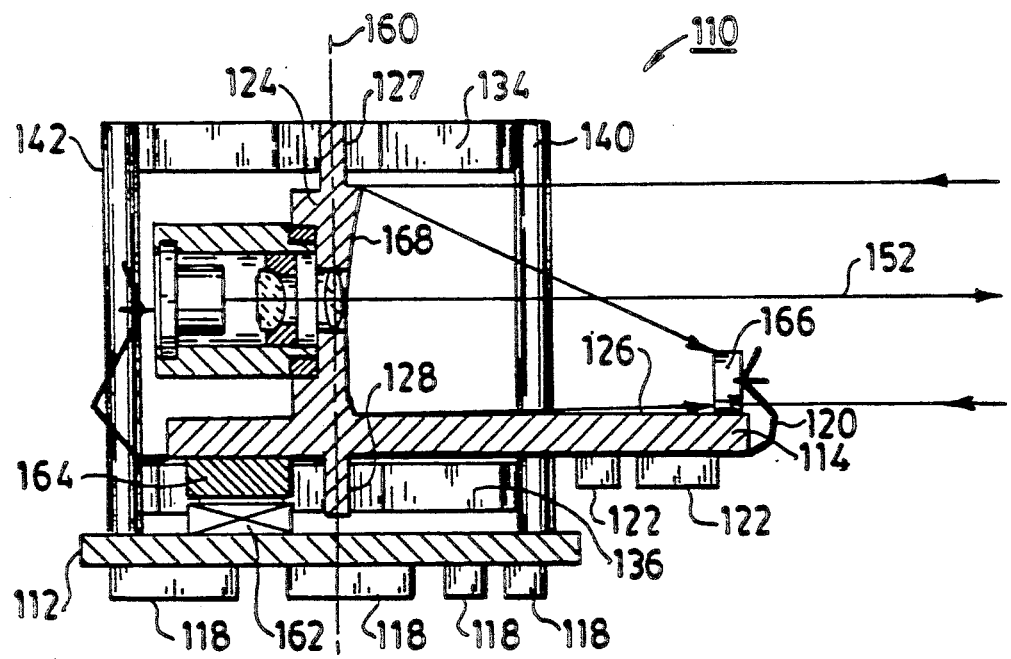
FIG. 9 is a sectional view taken along the line 9—9 in FIG. 8.

Referring to FIGS. 8 and 9, there is shown a scan module 110. Like the scan module 12, it has a mounting board 112 on which an electro-optical scanning assembly 114 is rotatably mounted on flexure pairs 116 and 118. The mounting board 112 has wiring and circuit elements 118 thereon. The assembly 114 has a flex board 120 with wiring and circuit elements 122. Like the assembly 26, the assembly 114 has an upstanding wall 124 and a platform 126. The wall 124 is narrowed in cross-section at its longitudinal ends 127 and 128. The side edges 130 and 132 of the wall at these ends 127 and 128 have the center of the flexure pairs 116 and 118 connected thereto. Such connections are preferably made by welding or brazing to conductors embedded in the wall 124. The flexure pairs 116 and 118 are each are a pair of bands of spring material such as phosphor bronze, stainless steel or beryllium copper. The flexure bands 134 and 136 of the flexure pair 116 are shown in FIG. 9. It will be appreciated that the flexure pair 118 has another pair of such band flexures symmetrically disposed about the lateral central plane of the device 110 when the assembly 114 is in its center or rest position (non-rotating). Each of these bands is of the same shape, specifically shown to be of the general shape of the letter "W" with the apex of the W connected to the edges 130 and 132. Flexures of shapes other than the "W" shape may also be used, e.g., each of the sections between the posts and the edges may be "S" shaped. The outer ends of the flexures are connected to posts 140, 142, 144 and 146. The assembly 114 is supported by the flexures so that it has an axis of rotation 160 through the center of mass of the assembly 114. The spring mass relationships of the flexures and the asembly 114 are preferably such that it is resonant at the scanning rate. An electromagnetic driver having coils 162 and a magnet 164 which is part of the assembly 114 is used to oscillate or nutate the assembly thereby scanning the beam 152 and also the photodetector 166 which receives the reflected light off a mirror on the forward surface 168 of the wall 124.

Figure 10:
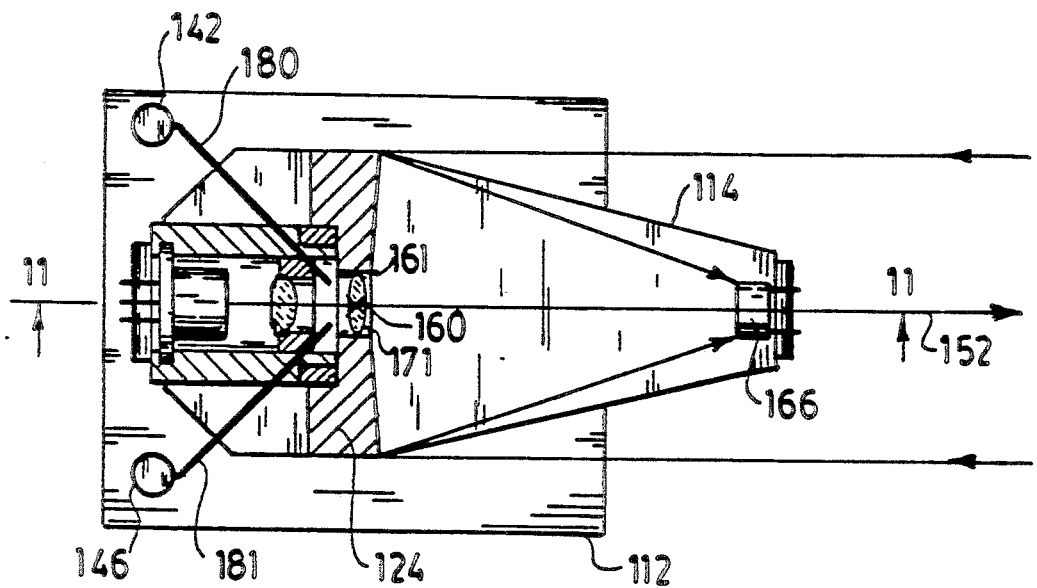
FIG. 10 is a plan view of a scan module in accordance with a third embodiment of the invention.
Figure 11:
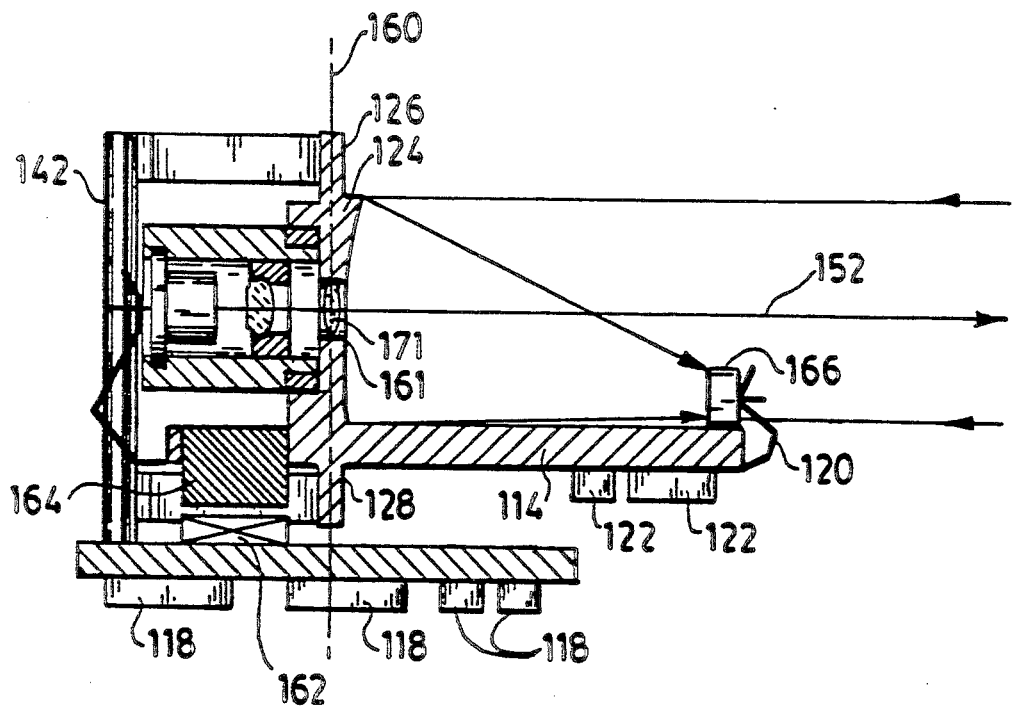
FIG. 11 is a sectional view taken along the line 11—11 in FIG. 10.

Referring to FIGS. 10 and 11, there is shown another embodiment of the invention which is similar to the embodiment shown in FIG. 8, and to the extent of such similarity, like parts are labeled with like reference numerals. The flexural support for the assembly 114 in the embodiment of FIGS. 10 and 11, is provided by two pairs 180 and 181 of flexure bands which extend between the wall 124 and the posts 142 and 146. The bands are of stainless steel, phosphor bronze or beryllium copper and extend between the posts and the regions of the wall 124 at the longitudinal edges 126 and 128 thereof. The bands are embedded in these edge regions 126 and 128 on opposite sides of the axis 160 of rotation just to the rear of the aperture 161 through which the scanning beam 152 projects. This flexural support arrangement reduces the profile of the device forwardly of the axis of rotation and provides cost reduction by virtue of the greater simplicity of the flexural support.

A cylindrical lens 171 is preferably located in the aperture 161 with its cylindrical axis along the axis of rotation 160. This lens will define the beam 152 as an oblong beam wider along the direction of the axis than in a direction perpendicular thereto. Such a beam will be longer in the direction of the bars of the code being scanned.

In each of the embodiments of the invention shown in FIGS. 8, 9, 10 and 11, the flexures provide stiffness in every direction (X, Y, Z axes) about the center of mass of the scanning assembly, and therefore robustness even against shock loads. The longitudinal stack of flexures provides stiffness along the axis of rotation. The flexures also provide stiffness in planes mutually perpendicular to the axis of rotation.

Figure 12:
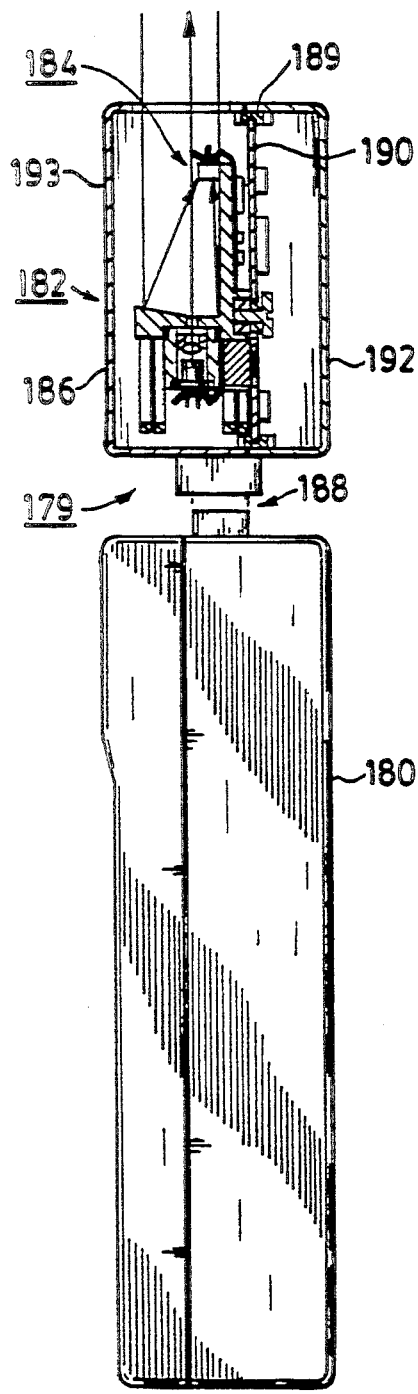
FIG. 12 is an elevational view of a hand-held, portable collection terminal having a scan module similar to the module shown in FIG. 1, but supported in its housing by a rubber grommet, connectable to but shown separated from a data entry and logging unit of the terminal collection terminal.
Figure 13:
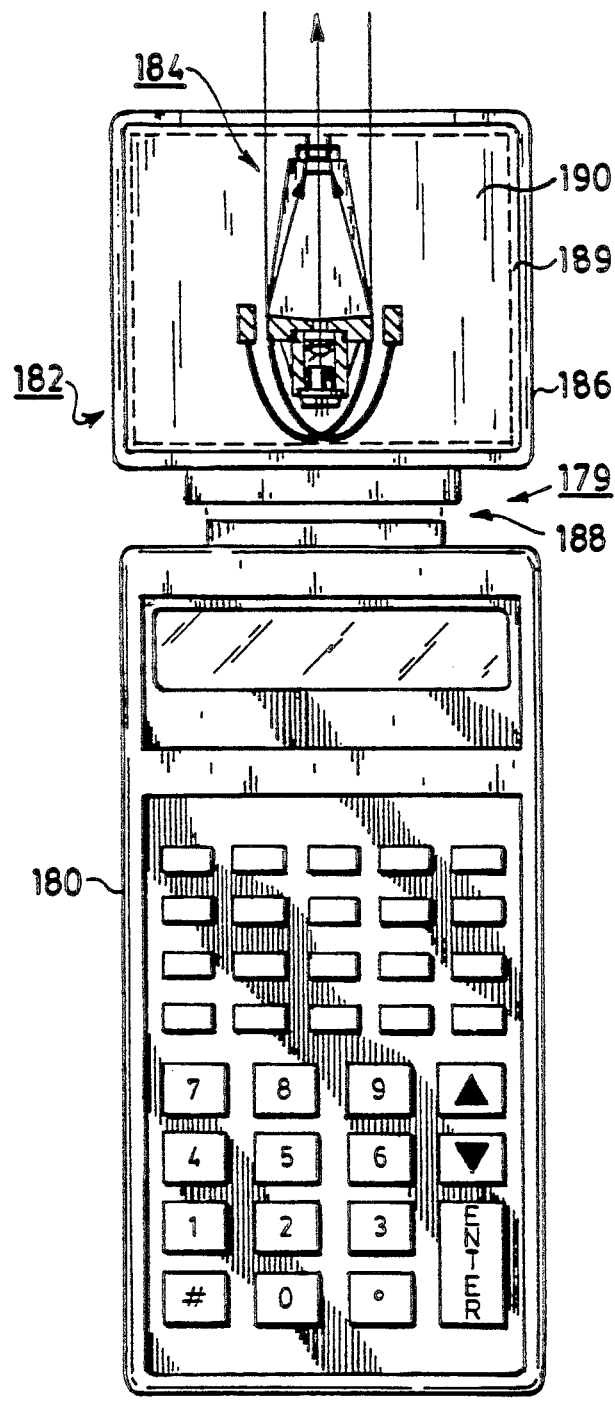
FIG. 13 is a plan of the terminal shown in FIG. 12.

Referring to FIGS. 12 & 13, a terminal 179 for collection of data has a unit 180 with a keyboard for manual entry of data. The design of the unit may be conventional. It has batteries and is adapted to be held in one hand by an operator. The other part of the terminal is a scan module 182. The module has an assembly 184 in a housing 186. The assembly 184 is similar in design to the assembly 26 and board 14 shown in FIGS. 1-4. Scanning assemblies of the designs shown in the other FIGS. may also be used. The module 182 and the unit 180 have mating connectors 188 which mechanically and electrically connect them together. The housing 186 has a base section 192 with a grommet 189 around the edge of the rectangular circuit board 190 of the assembly 184. The housing has an upper section 193 which slips or is latched on the lower housing section and captures the board 190 and grommet 189. The grommet is made of rubber or other elastomeric material and shock mounts the assembly 184.

From the foregoing description, it will be apparent that there has been provided an improved bar code scanner which is adapted to be miniaturized and is robust so as to be practical for use in operating environments where the scanner may be dropped or otherwise mishandled. Variations and modifications of the herein described scanner within the scope of the invention will undoubtedly suggests themselves to those skilled in the art. Accordingly, the foregoing description should be taken as illustrative and not in a limiting sense.

I claim:

1. A miniature bar code scanner module which comprises a mounting board which supports said module and provides means for attaching said module to a housing, a body having a platform and a wall on said platform, said wall having opposite sides, an aperture extending through said wall between said opposite sides, an assembly including a diode laser mounted on said wall on one of said opposite sides thereof over said platform and projecting a beam of light through said aperture towards a bar code to be scanned, a photodetector mounted on said platform facing the other of said opposite sides of said wall, said other of said opposite sides defining a surface reflecting light from said code onto said detector, a plurality of flexures which flexurally locate said body on said board, and support said body on said board for reciprocal rotation to enable said beam of light from said laser diode to scan said code, and means on said board and said body which reciprocally rotates said body about an axis perpendicular to said board so that said laser and said photodetector scan said code.

2. The module according to claim 1 wherein said body is rotatably mounted on said board on a journal extending therebetween.

3. The module according to claim 1 wherein first and second pairs of said flexures are provided, a support for said flexures on said board, said flexure pairs extending from said support to said wall and being connected thereto.

4. The module according to claim 3 wherein said body, said laser and said photodetector comprise an assembly having a center of mass, said axis being through said center of mass.

5. The module according to claim 4 wherein said connections of said flexures and said wall are located approximately in a plane through said center of mass.

6. The module according to claim 3 wherein each of said flexures is a separate band of spring material, said bands having side surfaces, the side surfaces of the flexures of each said pair of bands being disposed in alignment with each other and spaced at different distances from said board.

7. The module according to claim 6 wherein aid flexures each have at least one bend therein between said wall and said support.

8. The module according to claim 7 wherein said flexures shape approximately that of the letter "C".

9. The module according to claim 3 wherein said wall has laterally spaced edges extending between said opposite sides thereof, said support defining a first and a second pair of locations extending from said board and spaced from said one side of said wall, said first pair and second pair of locations being spaced laterally apart from each other on opposite sides of said axis of rotation a distance at least equal to the distance between said laterally spaced edges of said wall.

10. The module according to claim 9 wherein said support defines third and fourth pairs of locations extending from said board and spaced from said other side of said wall, said third pairs and fourth pairs of locations being spaced laterally apart from each other on opposite sides of said axis, said first pair of flexures having ends connected to said support at said first and third pairs of locations, said second pair of flexures being connected to said support at said second and fourth pairs of locations, and said flexures being connected to said laterally spaced edges intermediate the ends of said flexures.

11. The module according to claim 10 wherein said support is provided by four posts extending from said board, said posts each extending in the same direction as said wall, said posts providing a different one of said first, second, third and fourth pairs of locations.

12. The module according to claim 10 wherein said flexures are bands of spring material having bends between said lateral edges of said wall and said pairs of locations, said flexures defining shapes. approximately in the form of the letter "W" with central apexes at said lateral edges.

13. The module according to claim 9 wherein said first and second pairs of locations are disposed between said board and said aperture.

14. The module according to claim 9 wherein said wall also has edges spaced longitudinally from each other along said axis, a first of each of said first and second pairs of locations being spaced between said board and said aperture, and the second of each of said first and second pairs of locations being spaced between said longitudinally spaced edges and said aperture.

15. The module according to claim 14 wherein said first and second flexures are bands of spring material extending from said first and second locations to said wall adjacent said longitudinal edges thereof and in the immediate vicinity of said axis.

16. The module according to claim 3 further comprising a circuit board carried on said platform, connections from said laser and said photodetector to said circuit board, said mounting board also carrying circuits, connections from said flexures to said circuit board on said platform and to said mounting board circuits.

17. The module according to claim 16 wherein said connections comprise conductors in said support.

18. The module according to claim 1 further comprising a lens in said aperture.

19. The module according to claim 18 wherein said lens is a cylindrical lens having a cylindrical axis along said rotation axis.

20. The module according to claim 18 further comprises means in said wall for removably receiving lenses having different power or shape.

21. The module according to claim 20 wherein said receiving means provides a snap-in connection for said lenses.

22. A portable, miniature, hand-held bar code scanning terminal which comprises a data collection and entry unit and scan module removably connected to said unit for providing therebetween mechanical support and electrical power and signal connections, said scanning module having a housing and an assembly comprising a body having a laser diode and a board adapted to carry circuit components and connecting elements, which support said body on said board for reciprocal rotation to enable a laser beam from said laser diode to scan said code , said body being movably attached to said board by means including a plurality of flexural elements, and means for reciprocatably driveng said body against restoring forces provided by said flexural elements to scan said laser beam generated by said laser diode across said code.

23. The module according to any one of claims 1, 2, 3, 4, 5, 6, 7, 8, 9, 10, 11, 12, 13, 14, 15, 16, 17, 18, 19, 20, 21, or 22 further including said flexure elements add stiffness to the reciprocation of said body.

* * * * *